May 19, 1942.  L. W. YOUNG  2,283,345
BLOWPIPE MACHINE
Filed April 26, 1940     5 Sheets-Sheet 5
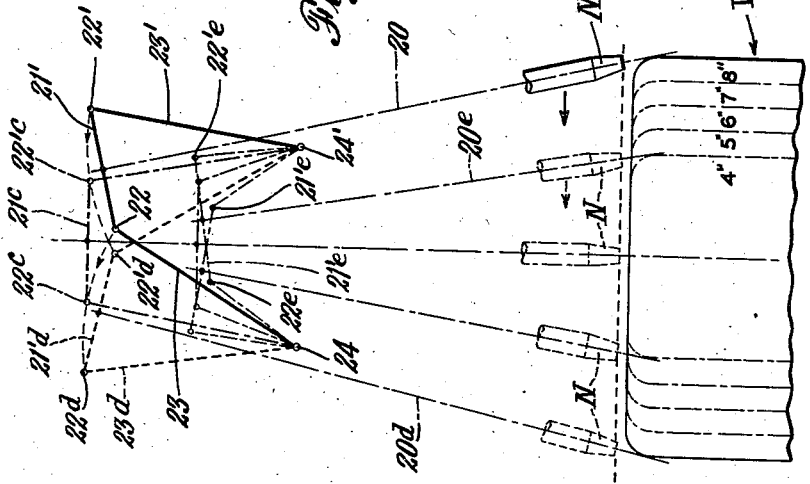
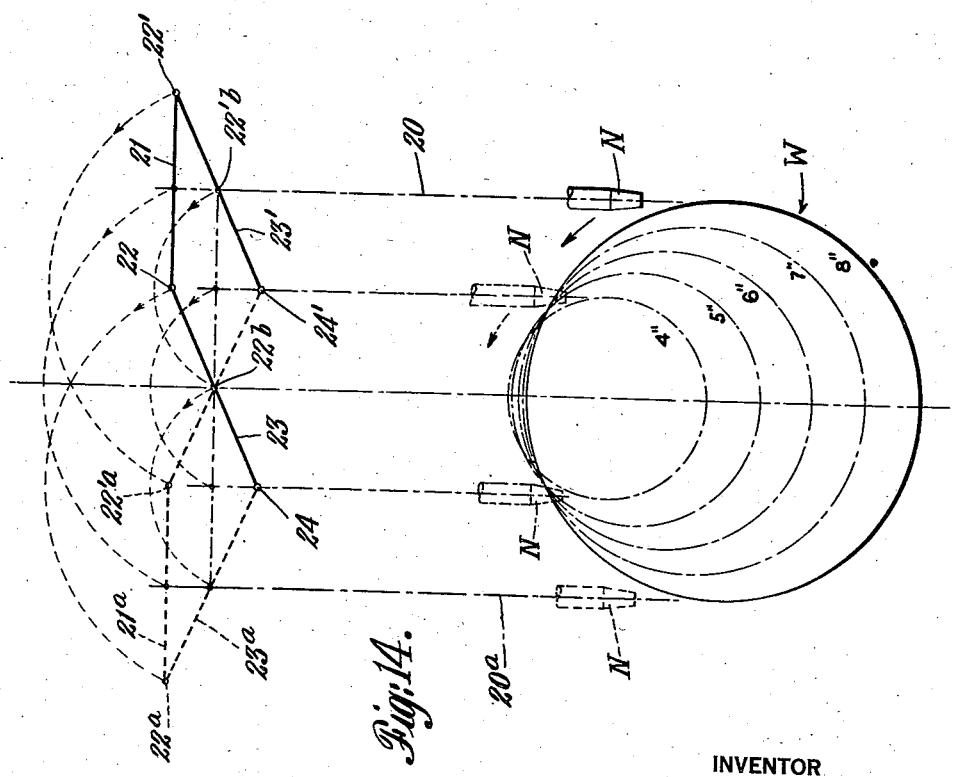
INVENTOR
LLOYD W. YOUNG
BY
ATTORNEY Patented May 19, 1942

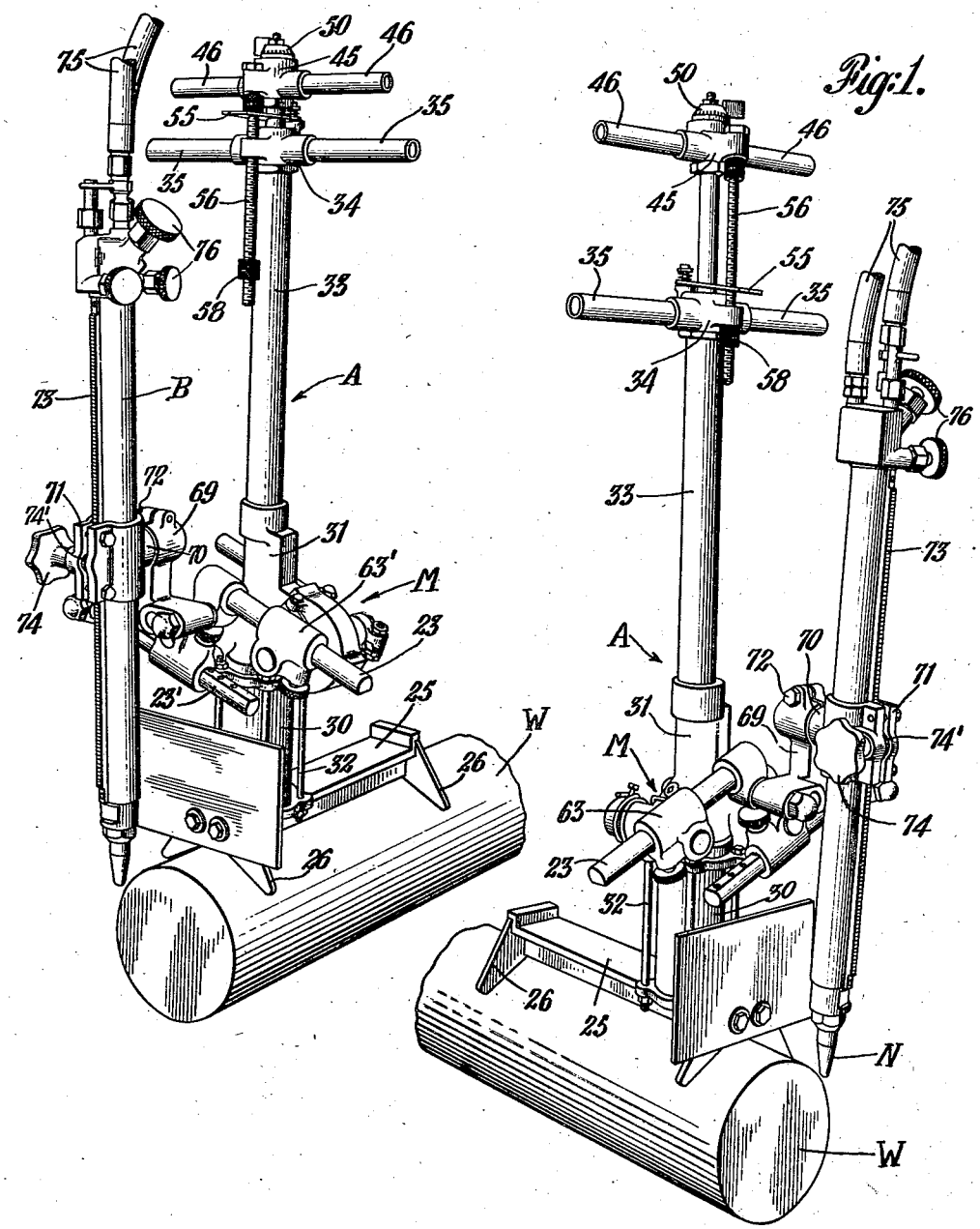

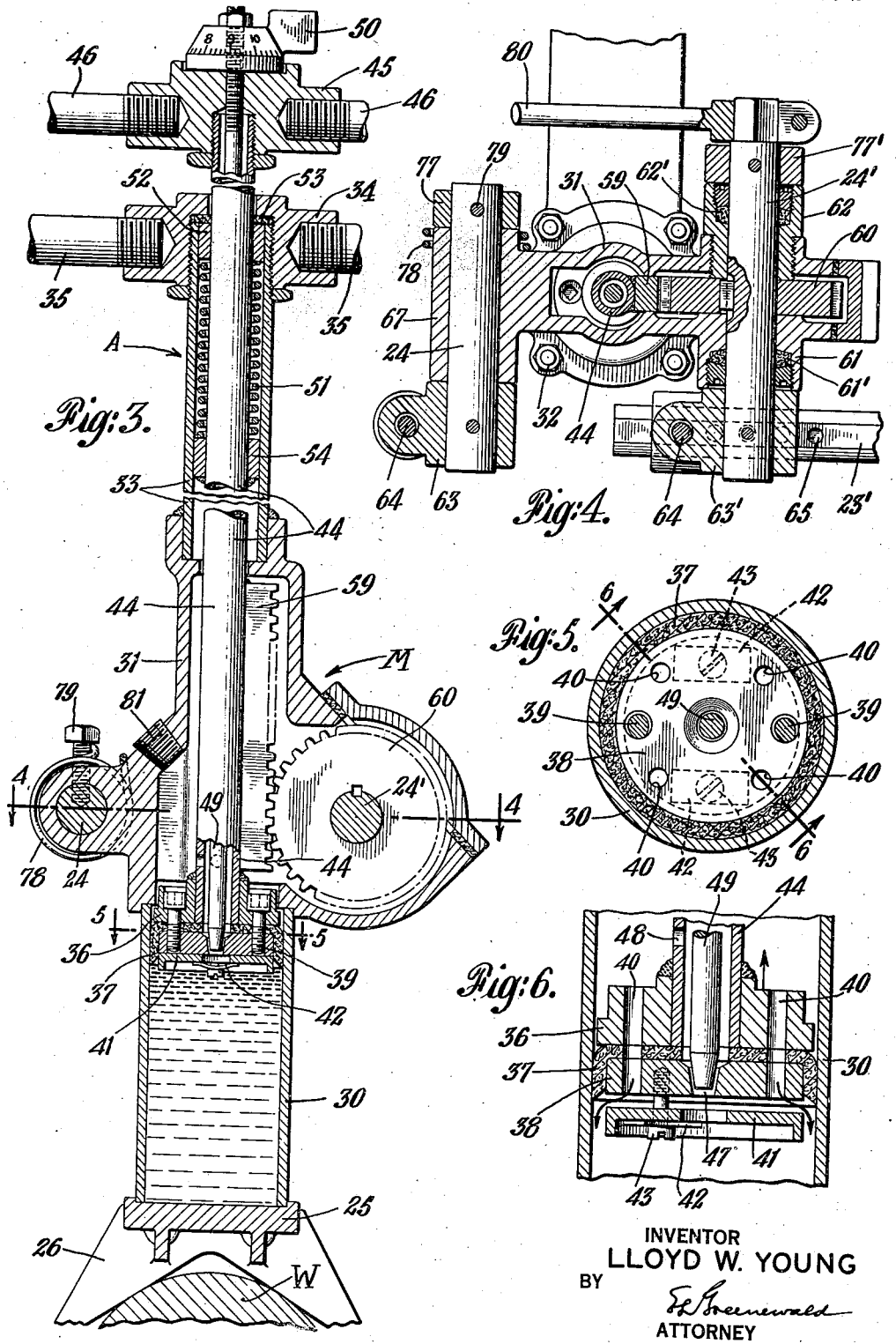

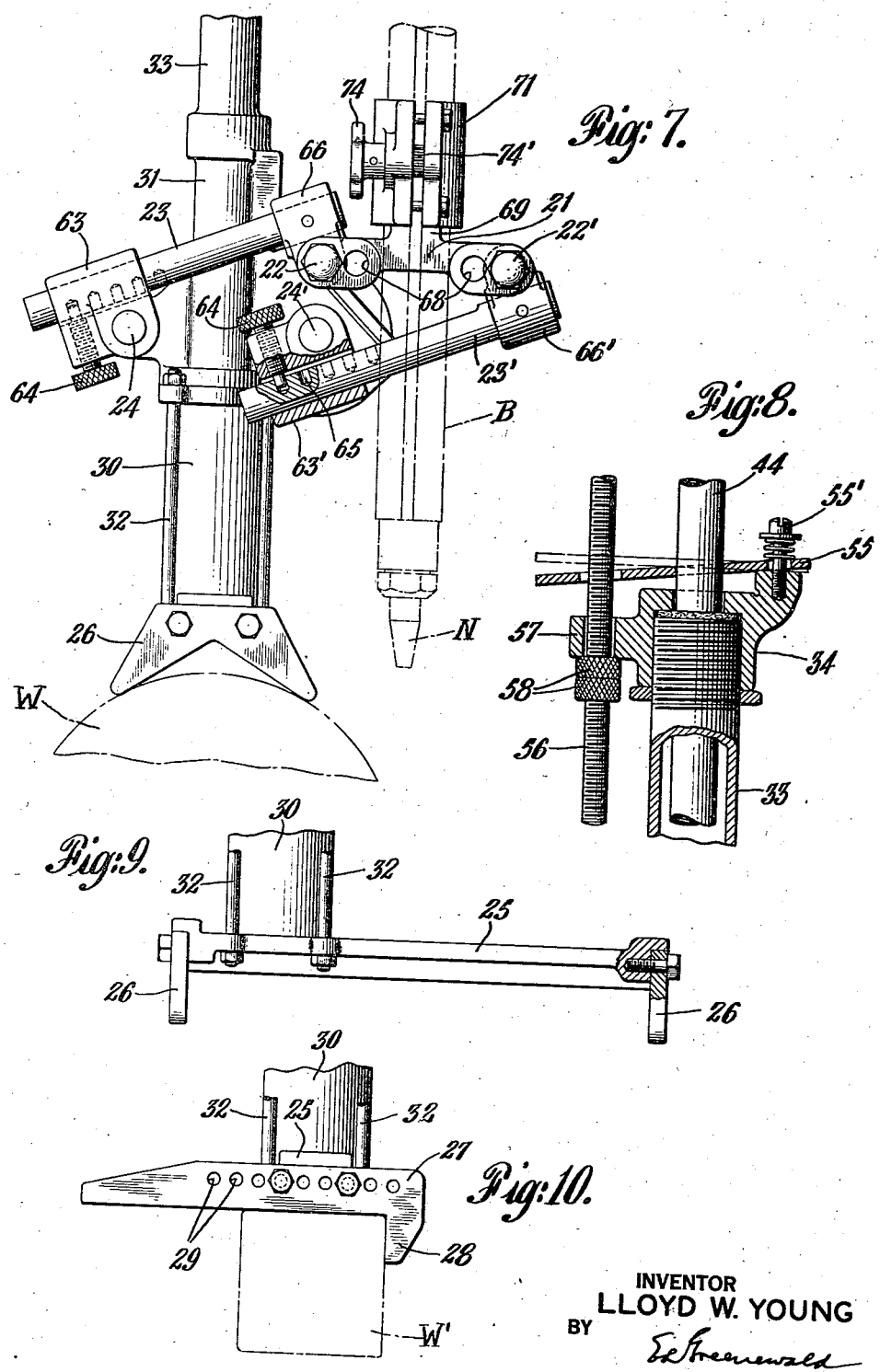

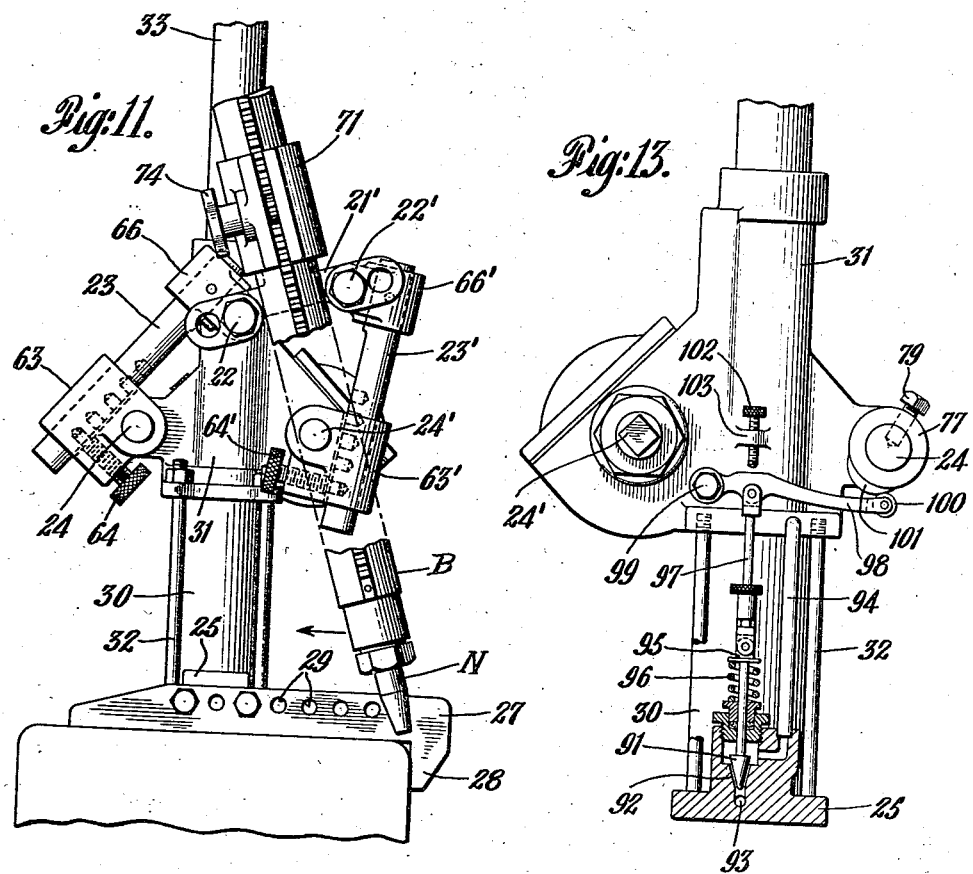
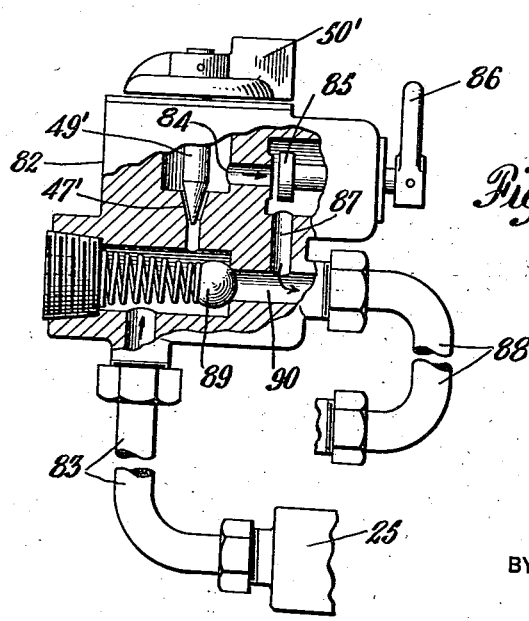

2,283,345

UNITED STATES PATENT OFFICE 2,283,345

BLOWPIPE MACHINE

Lloyd W. Young, Scotch Plains, N. J., assignor to Oxweld Acetylene Company, a corporation of West Virginia Application April 26, 1940, Serial No. 331,693

27 Claims. (Cl. 266—23)

This invention relates to machines for moving blowpipes in a predetermined path, and more particularly to machines for moving blowpipes such as oxy-acetylene cutting blowpipes in predetermined paths transversely with respect to metal bodies such as round and rectangular bars, billets, and the like.

Steel bars and billets have been cut by blowpipes which project a stream of oxidizing gas such as pure oxygen against a surface portion of the bar that has been heated to the ignition temperature by heating flames, the oxidizing gas combining with the heated metal and forming a kerf through the bar when the blowpipe is progressively moved transversely of the bar. In order to provide a cut surface that is substantially flat and square, it has been proposed to mount the cutting blowpipe on a mechanism that maintains the blowpipe nozzle or the axis of the cutting jet in the plane of the cut and moves it at a substantially uniform speed. For efficient cutting, it is desirable to maintain the tip of the blowpipe nozzle at a uniform distance from the surface of the work during the cut and for this purpose it has been proposed to use a guide roller in contact with the work surface to guide the blowpipe in its movement across the work. This, however, is unsatisfactory because the roller does not maintain the distance constant when cutting round stock, particularly when the axis of the blowpipe is maintained vertical during the cut. The roller also may cause the cut to be irregular if the surface of the work is rough or covered with scale. It has also been proposed to mount the cutting blowpipe on a link connecting two vertically aligned cranks of equal throw radius so that the blowpipe will move through an arc parallel to the work surface of a round bar without contact therewith. Such prior apparatuses were not adjustable to cut both round and rectangularly shaped bars. Furthermore, such crank mechanism is subjected to binding and lost motion when passing through dead-center positions so that the movement of the blowpipe is inaccurate and unsteady. The prior bar-cutting machines were either hand driven or driven by electric motor. Thus, uniform movement was difficult to obtain by the former method while the latter method required connection with an external source of power of the proper character which thus limits the scope of the usefulness.

A principal object of the present invention is to provide an improved mechanism for moving a blowpipe in a predetermined path with respect to a metal body.

Other objects of the invention are to provide an improved mechanism for moving a blowpipe nozzle through an arcuate path; for moving a blowpipe nozzle through a substantially straight path while simultaneously varying the angle of inclination of the nozzle; to provide a novel mechanical movement for converting rotary motion to substantially straight line movement; to provide an improved mechanism for moving a cutting blowpipe transversely with respect to a bar or billet to be cut which may be quickly adjusted to cut round bars with arcuate movement of the nozzle and to cut rectangular bars with substantially straight line movement of the nozzle, to cut various diameters of round bars, and to cut various widths of rectangular bars; to provide such a mechanism which shall be relatively light and portable; to provide a blowpipe machine which will automatically move the blowpipe at cutting speed independently of an external source of motive power; to provide such a machine in which the blowpipe moving speed may be accurately adjusted within a relatively wide range; to provide such a machine which may be quickly reset for starting another cut; and to provide such a machine which will be efficient and relatively simple to manufacture.

These and other objects and novel features of this invention will become apparent from the following description taken in connection with the accompanying drawings in which:

Figs. 1 and 2 are perspective views of an exemplary machine embodying the principles of the present invention and arranged for transversely cutting a round bar;

Fig. 3 is a longitudinal sectional view of the machine showing the hydraulic movement regulating mechanism;

Fig. 4 is a fragmentary view of a horizontal section taken on the line 4—4 of Fig. 3;

Fig. 5 is a view on an enlarged scale of a horizontal section taken on the line 5—5 of Fig. 3;

Fig. 6 is a fragmentary vertical sectional view on an enlarged scale of the hydraulic portion of the machine;

Fig. 7 is an elevational view on an enlarged scale of the crank and connecting-link mechanism adjusted for cutting a large diameter round bar;

Fig. 8 is a detailed view partly in section and on an enlarged scale of the cocking and release device;

Fig. 9 is a fragmentary side elevational view of the base of the machine;

Fig. 10 is a fragmentary front elevational view of an alternative construction of the gauge plates on the base for mounting the machine on rectangular bars;

Fig. 11 is an elevational view showing the crank and connecting-link mechanism of the machine arranged for cutting rectangular bars;

Fig. 12 is a fragmentary view showing an alternative arrangement of the speed controlling valves including another movement stopping device;

Fig 13 is a rear elevational view with parts broken away showing an arrangement for varying the speed of movement; and Figs. 14 and 15 are diagrammatic representations to illustrate the crank, connecting link, and blowpipe axis relationships when respectively cutting various sizes of round bars and various sizes of rectangular bars.

A preferred embodiment of the machine, according to the invention, comprises a hydraulic driving mechanism A which is adapted to be mounted on the top surface of the work W and arranged to rotate a crank mechanism M which carries the cutting blowpipe B. The mechanical details of the mechanism M will be described hereinafter. The operation of the crank and connecting-link mechanism will now be described in connection with Figs. 14 and 15.

In Fig. 14 the positions of various diameters of round bar stock that may be cut are indicated at W by the circles which are designated 4″, 5″, 6″, 7″, 8″, to indicate the diameter in inches of the particular bar. The axis of the blowpipe B at the start of a cut is indicated by the vertical center line 20. The center line 20 is maintained perpendicular to the horizontal line 21 which represents a connecting link that connects the centers of two crank pins 22 and 22′. The axis 20 is positioned midway between the crank pins 22 and 22′. The crank pins 22 and 22′ are at the outer ends of crank arms 23 and 23′ which rotate about horizontal fixed axes 24 and 24′. The axes 24 and 24′ are perpendicular to the plane of the paper and parallel to the axis of the work W.

It will be observed that the crank arms 23, 23′ and the connecting link 21 form a parallelogram and that when the arms 23 and 23′ are swung to the left all points on the connecting link 21 will describe arcs which have a radius equal to the length of the arms 23 and 23′ which are equal. Likewise, all points on the center line 20 which is maintained perpendicular to the link 21 will also describe arcs having the same radius. Furthermore, all the successive positions of the link 21 will be horizontal and the blowpipe axis 20 will remain vertical. The end of the blowpipe nozzle N should not touch the surface of the work W and is preferably maintained about one quarter inch from the surface. The mechanism is therefore shown adjusted so that the radius of movement or the length of the crank arms 23 and 23′ is four and one quarter inches in order that the blowpipe nozzle N will move constantly parallel to the surface of an eight inch diameter bar. When the blowpipe nozzle axis reaches the finish position indicated at 20a, the crank pins 22 and 22′ will have moved to the positions shown at 22a and 22′a and the link 21 will have moved to the position 21a. When it is desired to cut a small bar such as the four inch diameter bar indicated, the lengths of the crank arms 23 and 23′ are shortened to have a throw radius of two and one quarter inches so that the crank pins 22 and 22′ will have the positions 22b and 22′b.

In order that the crank and link mechanism just described may be arranged to move the end of the blowpipe nozzle N in a substantially straight horizontal line so that a rectangular bar may be cut with high efficiency and with complete severence of the bar, it has been discovered that the arrangement illustrated diagrammatically in Fig. 15 may be employed.

In Fig. 15 the distance between the centers 24 and 24′ is the same as in Fig. 14. Likewise, for cutting eight inch stock the length of the crank arms 23 and 23′ is also the same. However, the length of the connecting link 21′ has been shortened a definite amount. The link 21′ is therefore shorter than the distance between the centers 24 and 24′ in Fig. 15, whereas in Fig. 14 the distances are equal. This shortening of the link 21′ causes the link to be tilted with respect to the horizontal, so that crank pin 22′ is higher than the crank pin 22 and the axis of the blowpipe 20 which is still equi-distant between the points 22 and 22′ and perpendicular to the link 21′, will be inclined to the vertical. Thus, the axis of the cutting nozzle N at the starting position adjacent the starting edge of the rectangular bar W′ will be inclined forwardly in the direction of cutting. When the cranks 23 and 23′ are rotated toward the left, the link 21′ will move up to a horizontal position 21′c, which horizontal position will be attained when the midpoint of the link 21′ meets the vertical center line between the centers 24 and 24′. Thus, at the midpoint of the movement, the axis of the blowpipe will be vertical and the crank pins 22 and 22′ will have moved to the positions shown at 22c and 22′c. When the cranks are swung to the left of the central position, the link 21′ will again be tilted but the point 22′ will be lowered to the position 22′d, while the point 22 will raise to the position 22d. The nozzle N will then have moved to a position adjacent the finishing edge of the work W′ and the axis of the nozzle will be inclined from the vertical in a direction backward of the direction of movement.

By so varying the inclination of the axis of the nozzle during its travel across the surface of a rectangular bar, a number of advantages are obtained. The forward inclination of the nozzle at the starting edge permits a more rapid preheating of the edge to occur under the action of the preheating flames and the inclination of the nozzle in the backward direction at the finishing edge of the work insures that the lower left-hand corner of the bar will be entirely cut through in spite of a cutting lag which occurs due to the movement of the nozzle across the work at an efficient cutting speed. Thus, the bar may be completely severed at a relatively high rate of speed. It has been discovered that the movement of the nozzle in a straight line occurs only for a certain distance equal to or slightly greater than the width of the work for which the machine is set to cut, the movement at greater distances from the center line reverting to a curved path. It has also been found that the mechanism adjusted as shown in Fig. 15 may be arranged to cut various sizes of rectangular bars without altering the length of the link 21′ or the distance between the centers 24 and 24′, by merely adjusting the length of the crank arms 23 and 23′ in a manner similar to the adjustment which is made for cutting various diameters of round stock, as illustrated in Fig. 14, allowance being made to provide suitable clearance of the nozzle above the work surface. Thus, for cutting bars that are eight inches wide the distance between both centers 24 and 24' and the respective crank-pin centers 22 and 22' is made about four inches. For cutting smaller bars such as a four inch wide bar, the length of the crank arms 23 and 23' is made about two inches.

It will now be apparent that when the machine is adjusted for cutting eight inch wide stock, narrower stock can be cut merely by limiting the distance travelled by the nozzle. However, the angularity of the nozzle will be correspondingly less at the beginning and end of the cut. This may be desirable under certain conditions, such as, when cutting smaller thicknesses or when it is desired to move the blowpipe relatively slowly so that the cutting lag is small.

When the mechanism is adjusted to cut four inch stock, the crank arms 23 and 23' are shortened so that the link 21' and crank pins 22 and 22' move to the positions 21'e, 22e and 22'e respectively. The active length of the blowpipe axis 20e is shorter by a corresponding amount so that the distance from the axes 24 and 24' to the work surface remains the same. The angularity of the starting and ending positions of the blowpipe axis 20e is substantially the same as the angularity of the axis 20 when cutting the eight inch stock.

It will be seen that since the distance of the centers 24 and 24' and the work surface remains the same irrespective of the size of the bar being cut, the base of the machine need not be vertically adjustable. It has also been found that for any given length of crank arm 23 and 23' only one point along the axis 20 of the blowpipe will move in a substantially straight line. Therefore, the nozzle N is positioned at such location along the axis 20. Points on the axis below the nozzle N will describe a downwardly curved arc while points above the end of the nozzle N will describe an upwardly curved arc. Thus, by properly positioning the nozzle along the axis 20 the nozzle could be moved in a direction parallel to variously curved surfaces. For obtaining straight line motion of the end of the nozzle N, it is found that the relationship between the length of the link 21', the distance from the link 21' to the end of the nozzle N, and the distance between the centers 24 and 24' is quite critical. For example, it has been determined that for cutting four to eight inch round bars and four to eight inch wide rectangular bars the distance between the centers 24 and 24' should be four inches; the length of the arms 23 and 23' should be from two to four inches plus approximately one quarter inch for nozzle clearance; the length of the link 21 should be equal to the distance between the centers 24 and 24' when cutting round bars and the length of the link 21' shortened for cutting rectangular bars should be three and one half inches; the distance from the link 21' to the end of the nozzle N may be anything desired when cutting round bars but for cutting eight inch wide rectangular bars such distance should be approximately ten and three quarter inches; and when cutting four inch rectangular bars such distance should be approximately eight and one half inches.

It will be obvious that the principles of the mechanism are not limited to the range of sizes from four to eight inches, but that the mechanism can be constructed and proportioned to operate on substantially any desired size or range of sizes of work.

Referring more particularly to Figs. 1 to 8, the structure of the preferred embodiment of the machine, according to the invention, will now be described in detail.

The motive unit A is supported on a base 25 adapted for mounting on the top of the work W by guide plates 26 which are V-shaped for accurately locating the base with respect to a round bar. For mounting base 25 on rectangular bar stock, an alternative form of guide plate 27 is illustrated in Fig. 10. The plate 27 has a downwardly projecting portion 28 for contacting one edge of the rectangular bar stock so that when the guide plate 27 is bolted to the base 25 in the proper position, the base will be centrally located with respect to the top surface of the bar. Near the forward end of the base 25 and extending vertically upward therefrom is a cylinder 30. Mounted on the upper end of the cylinder 30 is a frame or housing portion 31, the cylinder being secured fluid-tightly between the frame casting 31 and the base 25 by four bolts 32. The frame casting 31 forms a housing for the drive mechanism and is provided with a vertically extending tubular portion 33 which is in axial alignment with the cylinder 30. The tubular portion 33 has secured to its upper end a headpiece 34 provided with two laterally extending handles 35. In the cylinder 30 is a piston 36 (Figs. 5 and 6) which carries on its lower face a cup leather 37 secured thereto by a plate 38. The bottom of the cup leather 37 is clamped between the plate 38 and the head of the piston 36 by two screws 39. The downwardly extending skirt of the cup 37 makes fluid-tight engagement with the walls of the cylinder 30. The piston is provided with four ports 40 which pass directly through the piston 36, the bottom of the cup leather 37, and the plate 38. The ports 40 are controlled by a disk valve 41 which is normally held in engagement with the lower face of the plate 38 by the action of two leaf springs 42. The valve 41 and springs 42 are held in place by two headed studs 43 which allow the valve to move to and from the plate 38. The piston 36 is secured to the lower end of a hollow piston rod 44 which extends axially through the housing 31 and the extension 33 to a point above the headpiece 34. To the upper end of the tubular piston rod 44 is secured a casting 45 which is also provided with laterally extending handles 46.

To control the flow of fluid through the piston 36 there is provided a conical port 47 in the center of the plate 38 and one or more passages 48 in the wall of the hollow piston rod 44. Fluid can, therefore, then flow through the central hole in the valve 41 through port 47 and a centrally located hole in the cup leather 37 through the hollow piston rod and the passage 48 into the housing 31 above the piston. Means is provided for accurately regulating such flow of fluid which comprises a valve rod 49 having a lower conical end seatable in the port 47 and extending axially through the piston rod 44. The upper end of the valve rod 49 passes through the casting 45 and makes threaded engagement therewith. Therefore, by turning the rod 49 it may be moved up and down relatively to the plate 38 so that the passage through the plate 38 may be accurately controlled. For turning the rod 49 and indicating the size of the passage, the upper end carries a handle 50 having a disk portion which may be indexed. Thus, the rate of flow of fluid from the underside of the piston to the upper side may be accurately set and the setting calibrated. The piston is forced downwardly by a coil spring 51 located within the tubular portion 33 and surrounding the piston rod 44. The upper end of the spring 51 presses against a sleeve 52 that presses a fluid-sealing gasket 53 against the upper end of the headpiece 34 and the lower end of the spring 51 presses against a sleeve 54 which is firmly secured to the piston rod 44. When the handles 46 are pulled upwardly, the valve 41 will open and allow fluid to pass from the casting 31 into cylinder 30 through the ports 40. At the same time the spring 51 will be compressed. If no means were provided for holding the rod 44 in its upward position the spring would drive the rod and the piston downward again when the handles 46 are released. Rapid downward movement, however, is prevented by the closing of the valve 41 against the plate 38 to seal the ports 40. Therefore, the piston will descend only at the rate which is permitted by passage of the fluid through the port 47 according to the adjustment of the valve rod 49.

Means for retaining the piston rod in its upward position is provided in the form of a latch 55 (Fig. 8) which has a sharp-edged hole therein through which the rod 44 passes. One end of the latch 55 is rockably secured to a boss on the headpiece 34 by a spring retaining screw 55' while the other end of the latch has a large hole freely surrounding a limit rod 56. The limit rod 56 is secured at its upper end to a lateral projection of the casting 45 and is disposed parallel to the piston rod 44, passing slidably through a guide hole in a laterally projected portion 57 of the headpiece 34. The rod 56 is threaded and provided with stop nuts 58 which may be adjusted along the rod to suitably limit the movement of the piston rod.

For transmitting movement to the cranks 23 and 23' a vertically disposed rack 59 is secured along the lower portion of the piston rod 44 and a spur gear 60 mounted on the horizontal crank shaft 24' is arranged to make toothed engagement with the rack 59. The crank shaft 24' passes through the walls of the housing 31 and is journaled in a bearing 61 projecting from the forward wall of the housing and in a bearing 62 which is removably secured in the rear wall of the housing. The bearings preferably have oil seals 61' and 62' respectively. The gear 60 is keyed to the crank shaft 24' so that vertical movement of the piston rod 44 and rack 59 will cause rotation of the crank shaft. The end of the crank shaft 24', which projects forwardly from the bearing 61, is secured to a block 63' which carries an adjustable crank arm 23'. The crank arm 23' is a cylindrical rod which is slidably secured at right angles to the crank shaft 24' in a bore of the block 63', and is offset at a sufficient distance from the shaft 24' to provide clearance for longitudinal adjustment of the arm 23'. The arm 23' may be set in any desired position and maintained in such adjusted position by a set screw 64 which preferably engages with holes 65 drilled at desired intervals along the rod 23'. To the outer end of the arm 23' is secured a block 66'.

The block 66' has a portion extending to the same side of the arm 23' as the crank shaft 24', which portion carries the crank pin 22' that is parallel to the crank shaft 24'. It will be obvious that adjustment of the distance between the crank shaft 24' and the crank pin 22' could also be obtained by having the arm 23' fixedly connected with the crank shaft 24' and adjustably secured to the block 66'. The crank shaft 24 is parallel to and horizontally in line with the crank shaft 24' but is secured in a single bearing extension 67 of the housing 31. The forwardly extending end of the crank shaft 24 is secured to a block 63 similar to the block 63' and which adjustably carries an arm 23 similar to arm 23'. To the outer end of arm 23 is secured the crankpin block 66 that carries the crank pin 22. The link 21 connects the crank pins 22 and 22' to which its ends are journaled. The link 21 is also provided with a pair of bearing openings 68 for use when the machine is to be adjusted for operating on rectangular billets. The crank pins 22 and 22' are threadedly secured to their respective pin blocks 66 and 66' so that they may be quickly removed and shifted to the outer or inner bearing holes of the link 21.

The link 21 carries an upwardly extending portion 69 (Fig. 1), which adjustably carries a horizontal trunnion 70 that projects rearwardly from a blowpipe holder clamp 71. A bolt 72 is provided for clamping the trunnion so that the blowpipe B may be held in a fixed adjusted position. The blowpipe B has a substantially cylindrical body that is vertically slidable in the holder 71, and for quickly making desired vertical adjustments of the blowpipe, there is provided a rack 73 along the forward side of the blowpipe which meshes with a pinion 74' in the holder that is rotatable by the handwheel 74. The blowpipe B may be of a customary construction and therefore will not be described in detail. Oxidizing and fuel gases are supplied to the upper end of the blowpipe through flexible hoses 75 and the flow of such gas is controlled by suitable valves 76 in the head of the blowpipe.

To prevent longitudinal forward movement of the crank shafts 24 and 24' there is provided at the rearwardly extending ends of each shaft set collars 77 and 77' (Fig. 4). Since the weight of the blowpipe on the crank mechanism and the weakening of the spring 51 as it lengthens may have a slightly adverse effect on the rate of movement of the blowpipe, there is provided a load comprising, for example, a supplemental torsion spring 78 at the rearwardly extending portion of the crank shaft 24. Such torsion spring has one end secured to a stud 79 on the set collar 77 and the other end hooked on the housing 31. The spring 78 acts to eliminate lost-motion by always acting against the movement of the cranks.

When cutting square bars it is found that the speed of movement of the blowpipe during the cut is substantially constant at the rate for which the mechanism is set. However when the machine is adjusted to cut round bars there is a variation in the speed of movement due to the vertical movement of the center of gravity of the blowpipe. The variation of speed that occurs however is desirable because the blowpipe will proceed more slowly during the first half of the cut when the weight of the blowpipe is being raised and will increase its speed during the later part of the cut. The speed variation is not too great because the spring is strongest at the beginning of the cut and weakest at the finish. These factors thus counteract and could be arranged to substantially balance each other, but some speed variation is desirable because the cutting stream is essentially lagging with respect to the surface of the work at the start and it is desirable that the blowpipe nozzle move as slowly at the start as during the cutting of the thicker portions. In addition to pulling up the handles 46, the machine may be reset for operation by turning the crank shaft 24'. For this purpose there is secured to the rearwardly extending end of the crank shaft 24' a hand lever 80. The casing 31 may be filled with operating fluid through an opening sealed by a plug 81. A suitable operating fluid is an oil having a viscosity which is but little affected by temperature changes. Changes in viscosity, however, are readily compensated for by changing the adjustment of the handle 50 which regulates the cutting speed.

For operating the machine in cutting a round bar W, the machine is made ready, by securing the V-guides 26 to the base 25, by setting the crank pins 22 and 22' in the outer bearing holes of the link 21, by adjusting the length of the arms 23 and 23' according to the radius of the cross section of the round bar to be cut, and by adjusting the height of the blowpipe to the proper level when the machine is mounted on the bar W. The stops 58 will be adjusted to limit the movement so that the movement of the blowpipe will be from the desired starting position to the desired finishing position. The machine is then cocked by either pulling up handles 46 until the portion 57 of the headpiece is contacted by the stops 58 or by turning the hand lever 80. If the latch 55 is then pressed down, the machine will remain in the cocked position and the blowpipe heating flame may then be turned on by manipulation of valves 76 and by igniting the gases at the blowpipe nozzle end. When a portion of the surface of the work has been heated to the ignition temperature, the operator will turn the proper valve to turn on the oxidizing gas and at the same time will release the latch 55 by moving it upward, the spring under the head of the screw 55' maintaining the latch 55 horizontal and disengaged. Release of the piston rod 44 will allow the spring 51 to force the piston downward at a rate which is regulated by the passage of oil from cylinder 30 through the valve port 47, hollow shaft 44, and passage 48 into the upper side of the piston, the rate of flow and, therefore, the speed of movement being controlled by the setting of the handle 50. The piston rod 44 will carry the rack 59 downward, thus turning the gear 60 and crank shaft 24'. The arms 23 and 23' will thereby swing to the left at a uniform rate so that the bar W will be completely severed by the cutting stream of the blowpipe. It will be seen that the axis of the blowpipe B will be accurately maintained in a plane transverse to the billet W so that a square-cut end will be produced. If it is desired to make another cut on the same size bar only the oxidizing gas need be shut off and the machine reset for making the other cut by cocking it as by pulling up the handles 46, and moving the machine to the new location on the bar when the preheat has been obtained. At the new location, the cutting oxygen is again turned on and the latch 55 released to start the second cut.

If the machine is to cut a rectangular bar, the V-shaped guide plates 26 are removed and the guide plates 27 are substituted, the plates 27 being positioned by use of the proper holes 29 according to the width of the bar. The crank pins 22 and 22' are then shifted to the inner bearing holes 68 as shown in Fig. 11 and the length of the crank arms 23 and 23' is set according to the width of the bar to be cut. The machine may then be placed on the bar and the blowpipe adjusted until the nozzle is close to the surface of the work. The stops 58 are adjusted on the rod 56 according to the width of the bar so that the blowpipe will start and finish accurately at the corners of the billet. The machine may then be cocked, as previously described, the preheating gas is turned on, and a portion of the corner of the work heated to the ignition temperature after which the oxidizing gas valves are opened and the latch 55 released. The machine will then automatically complete the cut.

It will be seen that this bar-cutting machine may be placed on bars or billets located anywhere, that it is not necessary to have available a source of power, and therefore the machine may be used wherever a portable supply of oxidizing and fuel gas may be brought.

It is not essential that the speed regulating valves be in the piston 36, but such valves may be externally arranged and suitably connected as, for example, illustrated in Fig. 12. Thus the piston 36 may be a simple solid piston, the valve 41, port 47, valve rod 49 and latch 55 being entirely eliminated. Instead a valve unit 82 may be supported on the machine, for example on the head piece 34. The unit 82 has a valve 49' cooperating with a port 47' and operable by an indexing handle 50' to control the flow of fluid from the lower to the upper side of the piston 36. Port 47' is connected by a conduit 83 with a passage in the base 25 leading to the interior of the cylinder 30. The outlet side of port 47' communicates with a port 84 that is controlled by a quick opening stop valve 85. The valve 85 is movable by a handle 86. The outlet side of port 84 is connected by a passage 87 to a conduit 88 which connects to the casing 31 above the piston 36. To permit a quick upward movement of the piston 36 a check valve 89 is provided to control a bypass connection 90 between conduit 83 and passage 87.

When the machine is cocked, as by moving the handle 80, the oil will be free to flow through conduit 88 by pass 90 and down through conduit 83. When the machine has been cocked and valve 85 is closed the piston 36 will not move, since no oil can pass from the lower to the upper side thereof but when the valve 49' is adjusted to the desired opening and the valve 85 is opened the oil will flow at the regulated rate from conduit 83 through ports 47' and 84, passage 87 and conduit 88 to the casing 31.

It may, under certain conditions, be desirable to automatically and positively vary the speed of movement during the cutting stroke by means of providing adjustability of the degree of speed variation. A suitable device that may be applied to the machine for this purpose is illustrated in Fig. 13 which shows a metering valve 91 controlling a valve port 92 connected with the interior of the cylinder 30 by a passage 93 in a projection of the base 25. The outlet side of the port 92 is connected by a conduit 94 with the interior of the casing 31. The upper end of the stem of valve 91 is provided with a head 95 which is urged upwardly by a spring 96. An adjustable rod 97 is pivoted to the head 95 and to the mid portion of a lever 98. The lever 98 is pivoted at one end on a stud 99 projecting from the casing 31 and at the other end is mounted a cam follower roller 100. The cam follower 100 is positioned to engage a cam 101 secured to the collar 77. The cam 101 may be so shaped and positioned that the valve 91 will be open widest at either end portion of the stroke of the machine and open least when the blowpipe is in the middle position. A screw 102 threaded in a projection 103 of the casing 31 may be provided to hold the valve 91 closed and inoperative when it is desired not to regulate the normal operation of the machine. The degree of opening of the valve 91 is regulatable by adjusting the length of the rod 97. By varying the shape and position of the cam 101, substantially any type of speed variation can be obtained, for example, a speed change tendency caused by the changing force of the operating spring 51 or by the changing reaction of the weight of the blowpipe could be compensated for.

The particular embodiments of the invention herein described and illustrated in the drawings are presented to indicate how the invention may be applied. Other forms, differing in detail but not in principle from that disclosed, will, of course, suggest themselves to those skilled in the art. For example, instead of the compression spring 51 there may be employed a helical or a spiral torsion spring acting between the crank shaft 24 and the casing 31 similarly to but opposite in direction to the spring 78. It will also be possible to provide a gear on the crank shaft 24 similar to the gear 60 and arrange both gears to be driven by racks or by a single rack when the machine is adjusted to cut round bars. When adjusted to cut rectangular bars, however, the crank shafts cannot be geared together since the rates of movement differ at various portions of the movement. In the embodiment illustrated in Figs. 1 to 10, inclusive, the latch 55 may be eliminated and the starting and stopping of the cutting movement may be controlled by means for quickly closing the valve 49 and opening the valve to the adjusted degree. In a similar manner the stop valve 85 in Fig. 12 might be eliminated by adding means for quickly opening and closing the valve 49' in addition to the means for regulating the degree of opening. It will also be apparent that other blowpipes than cutting blowpipes may be mounted on the machine for performing other operations on the work.

What is claimed is:

1. Blowpipe mechanism which comprises a frame adapted to be mounted in operative relation to a work surface; a pair of crank arms mounted for rotation with respect to said frame about spaced parallel fixed axes; a link member connecting said crank arms, said link member being pivoted to the outer portions of said arms; a blowpipe; and means for holding said blowpipe on said connecting link member, the longitudinal axis of said blowpipe being transverse to the main axis of said link member and to said fixed axes; the construction and arrangement being such that the pivot connections of said link member to said crank arms are constrained to move in arcs only on one side of the common plane containing said fixed axes.

2. Blowpipe mechanism according to claim 1 in which the distance between said fixed axes is equal to the distance between the axes of the pivot connections of said link member to said crank arms, whereby said blowpipe is constrained to move with its longitudinal axis in a plane perpendicular to said fixed axes and in an arcuate path.

3. Blowpipe mechanism which comprises a frame adapted to be mounted in operative relation to a work surface; a pair of crank arms mounted for rotation with respect to said frame about spaced parallel fixed axes; a link member connecting said crank arms, said link member being pivoted to the outer portions of said arms; a blowpipe; and means for holding said blowpipe on said link member, the longitudinal axis of said blowpipe being transverse to the main axis of said link member; the distance between said fixed axes being greater than the distance between the axes of the pivot connections of the link member to the crank arms, whereby the nozzle end of said blowpipe is constrained to move with its longitudinal axis in a plane transverse to said fixed axes and in a path other than an arc having a radius equal to the radius of said crank arms.

4. Blowpipe mechanism which comprises a frame adapted to be mounted in operative relation to a work surface; a pair of crank arms mounted for rotation with respect to said frame about spaced parallel fixed axes; a link member connecting said crank arms, said link member being pivoted to the outer portions of said arms; a blowpipe; and means for holding said blowpipe on said link member, the longitudinal axis of said blowpipe being transverse to the main axis of said link member; the mounting for each of said crank arms comprising a crank shaft; a block secured to the crank shaft and holding a respective crank arm, said crank arms being adjustable lengthwise with respect to said blocks; and means on each block for securing said arms in desired lengthwise adjustment with respect to said crank shafts.

5. Blowpipe mechanism according to claim 1 in which said link member is constructed and arranged whereby the distance between the pivot connections of the link member to the crank arms is adjustable.

6. Blowpipe mechanism which comprises a frame adapted to be mounted in operative relation to a work surface; a pair of crank arms mounted for rotation with respect to said frame about spaced parallel axes; a link member connecting said crank arms and pivoted to the outer portions thereof; a blowpipe; means for holding said blowpipe on said connecting link; means operatively connected with at least one of said cranks for rocking the same through an arc, said rocking means including a gear, a rack meshing with said gear, and hydraulic means comprising a cylinder mounted on said frame in fixed relation to the axis of said gear, and a piston in said cylinder having a rod operatively connected with said rocking means for controlling the rate of movement of said blowpipe.

7. Blowpipe mechanism which comprises a pair of crank arms rockable about axes which are parallel to each other and spaced a fixed distance apart, said crank arms being of equal length; a connecting link pivoted to the outer portions of said crank arms, said pivot connections being spaced apart a predetermined distance less than the distance between said crank axes; a blowpipe secured to said connecting link at a point equi-distant between said pivot connections, the axis of said blowpipe being maintained perpendicular with respect to said link, said blowpipe extending in a direction perpendicular to said crank axes and between said crank axes, the relation between said distances and the length of said blowpipe being such that the nozzle end of said blowpipe will move in a substantially straight path when said crank arms are swung through arcs about said crank axes.

8. Mechanism for providing substantially straight line limited movement of one point thereof as a result of rotary motion of another portion of the mechanism which comprises a pair of crank arms swingable about axes which are parallel to each other and spaced a fixed distance apart, said crank arms being of equal length; a connecting link pivoted to the ends of said crank arms, said pivot connections being spaced apart a predetermined distance less than the distance between said crank axes; an arm secured to said connecting link at a point equi-distant between said pivot connections, said arm being perpendicular with respect to said link and extending in a direction perpendicular to said crank axes and between said crank axes, the relation between said distances being such that a selected point along the axis of said arm will move in a substantially straight path when said crank arms are swung through arcs about said crank axes.

9. Blowpipe mechanism which comprises a blowpipe; a holder for adjustably supporting said blowpipe; mechanism carrying said holder for moving said blowpipe in a path with respect to the surface of the work to be operated on, said mechanism including a crank mounted on a crank shaft; a gear mounted on said crank shaft; a rack meshing with said gear; a cylinder; a piston in said cylinder and operatively connected with said rack; means for urging said rack to move lengthwise; a load associated with said mechanism and acting through said holder, crank, crank shaft, gear and rack during movement of said blowpipe for eliminating lost motion in said mechanism; and adjustable means for regulating the flow of fluid from one side to the other side of said piston to regulate the speed of movement of said rack and thereby the speed of movement of said blowpipe along said path.

10. Blowpipe apparatus according to claim 9 which includes a hollow piston rod connected to said piston and in which said flow-regulating means comprises a port in said piston; a valve controlling said port said valve having a valve stem passing axially through said hollow piston rod to a point externally of said rod; and handle means for moving said stem to adjust the fluid passage through said port.

11. Blowpipe apparatus according to claim 9 including adjustable means for limiting the movement of said rack in either direction to adjust the starting and finishing positions of said blowpipe.

12. Blowpipe mechanism which comprises a blowpipe; a holder for adjustably carrying said blowpipe; mechanism supporting said holder for moving said blowpipe in a path with respect to a surface of the work to be operated upon, said mechanism including a crank mounted on a crank shaft; a gear mounted on said crank shaft; a rack meshing with said gear; a cylinder; a piston in said cylinder operatively connected with said rack; means for urging said rack to move longitudinally in one direction; a load associated with said mechanism and acting through said holder, crank, crank shaft, gear and rack during movement of said blowpipe for eliminating lost motion in said mechanism; adjustable means for regulating the flow of fluid from one side to the other side of said piston to control the speed of movement of said rack in said direction; and means for permitting the return flow of said fluid to said one side of the piston at a relatively high rate when said rack is moved in the opposite direction.

13. Blowpipe apparatus according to claim 12 in which said means permitting return flow comprises passage means through said piston having a relatively large cross-sectional area and valve means normally closing said passage means and operable when said rack is moved in said opposite direction.

14. Blowpipe mechanism which comprises a blowpipe; a holder for adjustably carrying said blowpipe; mechanism supporting said holder for moving said blowpipe in a path with respect to a surface of the work to be operated upon, said mechanism including a crank mounted on a crank shaft; a gear mounted on said crank shaft; a rack meshing with said gear; a cylinder; a piston in said cylinder operatively connected with said rack; means for urging said rack to move longitudinally in one direction; adjustable means for regulating the flow of fluid from one side to the other side of said piston to control the speed of movement of said rack in said direction; and means for permitting the return flow of said fluid to said one side of the piston at a relatively high rate when said rack is moved in the opposite direction, said means for regulating the flow of fluid including a regulating valve adjustable to regulate the rate of flow of fluid, and a stop valve in series with said regulating valve for quickly stopping and starting such flow of fluid.

15. Blowpipe mechanism which comprises a blowpipe; a holder for adjustably carrying said blowpipe; mechanism supporting said holder for moving said blowpipe in a path with respect to a surface of the work to be operated upon, said mechanism including a crank mounted on a crank shaft; a gear mounted on said crank shaft; a rack meshing with said gear; a cylinder; a piston in said cylinder operatively connected with said rack; means for urging said rack to move longitudinally in one direction; adjustable means for regulating the flow of fluid from one side to the other side of said piston to control the speed of movement of said rack in said direction; means for permitting the return flow of said fluid to said one side of the piston at a relatively high rate when said rack is moved in the opposite direction; and means for varying the rate of flow of fluid automatically in response to changing positions of said blowpipe during operation.

16. Blowpipe mechanism which comprises a blowpipe; a holder for said blowpipe; mechanism supporting said holder for moving said blowpipe with respect to a surface of work to be operated upon; means for driving said mechanism to move said blowpipe; hydraulic means for regulating the speed of movement, said hydraulic means including a cylinder, a piston operating therein, and regulating valve means for controlling the rate of flow of fluid from one side to the other side of said piston; and means associated with said regulating valve means operable to stop said flow of fluid and thereby stop the movement of said blowpipe and operable quickly to start said flow and thereby start movement of the blowpipe.

17. Blowpipe apparatus which comprises a blowpipe; mechanism for carrying said blowpipe and for moving said blowpipe in a path with respect to a surface of work to be operated upon, said mechanism including a crank mounted on a crank shaft; a gear mounted on said crank shaft; a rack meshing with said gear; a cylinder; a piston in said cylinder having a hollow piston rod extending from one end of said cylinder, said rack being secured along said piston rod; a housing secured to the end of said cylinder from which said rod extends, said housing surrounding a substantial portion of said piston rod and said rack; a spring surrounding said piston rod and having one end engaging said housing; a collar secured to said piston rod positioned to engage the other end of said spring whereby said spring urges the rod in one direction; manually operable means for moving said piston rod in the direction compressing said spring; fluid-passage means connecting the fluid spaces on both sides of said piston; non-return valve means controlling the flow of fluid through said passage arranged to permit free flow of fluid from the rod side of said piston to the head side of said piston during movement of said rod in the direction compressing said spring; other passage means connecting the fluid spaces on both sides of said piston; and valve means controlling the flow of fluid through said other passage means, said valve means being arranged to restrict the flow of fluid from the head side to the rod side of said piston for accurately regulating the rate of movement of said piston rod under the influence of the force of said spring.

18. Blowpipe apparatus which comprises a blowpipe; mechanism for carrying said blowpipe and for moving said blowpipe in a path with respect to a surface of work to be operated upon; said mechanism including a crank mounted on a crank shaft; a gear mounted on said crank shaft; a rack meshing with said gear; a cylinder; a piston in said cylinder having a hollow piston rod extending from one end of said cylinder, said rack being secured along said piston rod; a housing secured to the end of said cylinder from which said rod extends, said housing surrounding a substantial portion of said piston rod and said rack; a spring surrounding said piston rod and having one end engaging said housing; a collar secured to said piston rod positioned to engage the other end of said spring whereby said spring urges the rod in one direction; manually operable means for moving said piston rod in the direction compressing said spring; fluid-passage means connecting the fluid spaces on both sides of said piston; non-return valve means controlling the flow of fluid through said passage arranged to permit free flow of fluid from the rod side of said piston to the head side of said piston during movement of said rod in the direction compressing said spring; other passage means connecting the fluid spaces on both sides of said piston; valve means controlling the flow of fluid through said other passage means, said valve means being arranged to restrict the flow of fluid from the head side to the rod side of said piston for accurately regulating the rate of movement of said piston rod under the influence of the force of said spring; means for retaining said piston in the position in which said spring is compressed; and means for releasing said retaining means for initiating the cutting movement.

19. Blowpipe apparatus adjustable for cutting round and rectangular bars comprising in combination, a frame having a base adapted to be mounted on a horizontal bar, said base having gauge means for aligning said frame centrally over said bar; a pair of crank arms rockably mounted on said frame and rockable about horizontally spaced apart fixed axes, said axes being parallel to each other and to the longitudinal axis of said bar, said crank arms normally extending upwardly; crank pins at the outer end portions of said crank arms; a link pivotally connecting said crank pins; a blowpipe holder mounted on said link and centrally between said crank pins; a blowpipe adjustably carried in said holder, the longitudinal axis of said blowpipe being perpendicular to said link; means on said holder for adjusting said blowpipe longitudinally; means operatively connected with at least one of said crank arms for rocking said arms at a regulatable speed whereby said blowpipe will be moved in a plane substantially perpendicular to said bar at a desired cutting speed and the nozzle end of said blowpipe will be maintained at a substantially uniform distance from the surface of said bar during such movement; and adjustable means for changing the length of said link between said crank pins to adapt the apparatus for cutting either round or rectangular bars.

20. Blowpipe apparatus comprising a frame having a base adapted to be mounted on a horizontal bar, said base having gauge means for aligning said frame centrally over said bar; a pair of crank arms rockably mounted on said frame and rockable about horizontally spaced apart axes, said axes being parallel to each other and to the longitudinal axis of said bar, said crank arms normally extending upwardly; crank pins at the outer end portions of said crank arms; a link pivotally connecting said crank pins; a blowpipe holder mounted on said link and centrally between said crank pins; a blowpipe adjustably carried in said holder, the longitudinal axis of said blowpipe being perpendicular to said link; means on said holder for adjusting said blowpipe longitudinally; means operatively connected with at least one of said crank arms for rocking said arms at a regulatable speed whereby said blowpipe will be moved in a plane substantially perpendicular to said bar at a desired cutting speed and the nozzle end of said blowpipe will be maintained at a substantially uniform distance from the surface of said bar during such movement; said connecting link being constructed to provide outer and inner pivot connections; said outer connections being spaced apart sufficiently so that the distance between the crank pin axes will be equal to the distance between the axes about which the crank arms rock when the crank pins are pivoted in said outer connections in order that said blowpipe will be moved in an arcuate path, and said inner connections being spaced apart at such predetermined distances that, when the crank pins are pivoted in the inner connections, the nozzle end of said blowpipe will move in a substantially horizontal line.

21. Blowpipe apparatus according to claim 19 in which said means for rocking said arms comprises a gear, a rack meshing with said gear, means operatively connected with said rack for longitudinally moving said rack lengthwise and means for regulating the rate of movement of said rack whereby said blowpipe will be moved at a desired cutting speed.

22. Blowpipe apparatus adjustable for cutting round and rectangular bars comprising, in combination, a frame having a base adapted to be mounted on a horizontal bar, said base having gauge means for aligning said frame centrally over said bar; a pair of crank arms rockably mounted on said frame and rockable about horizontally spaced apart fixed axes, said axes being parallel to each other and to the longitudinal axis of said bar, said crank arms normally extending upwardly; crank pins at the outer end portions of said crank arms; a link pivotally connecting said crank pins; a blowpipe holder mounted on said link and centrally between said crank pins; a blowpipe adjustably carried in said holder, the longitudinal axis of said blowpipe being perpendicular to said link; means on said holder for adjusting said blowpipe longitudinally; means operatively connected with at least one of said crank arms for rocking said arms at a regulatable speed whereby said blowpipe will be moved in a plane substantially perpendicular to said bar at a desired cutting speed and the nozzle end of said blowpipe will be maintained at a substantially uniform distance from the surface of said bar during such movement; and adjustable means for changing the length of said link between said crank pins to adapt the apparatus for cutting either round or rectangular bars, said connecting link being constructed to provide outer and inner pivot connections; said outer connections being spaced apart sufficiently so that the distance between the crank pin axes will be equal to the distance between the axes about which the crank arms rock when the crank pins are pivoted in said outer connections in order that said blowpipe will be moved in an arcuate path, and said inner connections being spaced apart at such predetermined distances that, when the crank pins are pivoted in the inner connections, the nozzle end of said blowpipe will move in a substantially horizontal line.

23. Blowpipe mechanism for cutting work of any selected cross-sectional shape, which comprises, in combination, a pair of crank arms rockable about horizontal axes which are parallel to each other and spaced a fixed distance apart in a common plane, said crank arms being of substantially equal length, a connecting link pivoted to said crank arms, a blowpipe secured to said connecting link at a point substantially equi-distant between said crank arms, the longitudinal axis of said blowpipe being perpendicular with respect to said link and extending in a direction perpendicular to said axes, and means for adjusting the length of said link between said crank arms whereby, when the length of said link between said crank arms is equal to the distance between said axes, said blowpipe will move in an arcuate path, and when the length of said link between said crank arms is less than the distance between said axes, the nozzle end of said blowpipe will move in a substantially straight path when said crank arms are swung through arcs about said axes.

24. Blowpipe mechanism for cutting work of any selected cross-sectional shape according to claim 23, in which said crank arms are constructed and arranged so that their lengths are adjustable in equal increments.

25. Blowpipe apparatus for cutting work of any selected cross-selectional shape, which comprises, in combination, link means adapted to support cutting blowpipe means, crank arms connected to said link means, spaced crank shaft means on which said arms are mounted, the spacing of said crank shaft means being unequal to the length of said link means between said crank arms, and means for driving only one of said arms through its shaft means whereby the movement translated to such cutting blowpipe adapts it for cutting work of a predetermined cross section.

26. Blowpipe apparatus for cutting work of any selected cross-sectional shape, which comprises, in combination, a cutting blowpipe, a link on which said blowpipe is mounted at right angles, crank pins journalled to said link, pin blocks to which said pins are secured in parallel relation to each other, a pair of crank arms on which said blocks are mounted, crank blocks secured to said arms, crank shafts on which said crank blocks are rotatably mounted, means for fixing at least one of said crank blocks to its shaft, and means for driving said last-named shaft, the spacing between the centers of said crank pins being adjustable to a predetermined distance which is less than the spacing between the centers of said crank shafts so that the movement transmitted to said cutting blowpipe causes it to swing suitably for cutting work of rectangular cross section.

27. Blowpipe apparatus for severing rectangular stock of predetermined width which comprises a blowpipe having nozzle means for directing a cutting jet against a surface of said stock; a supporting frame positioned with respect to said stock to maintain said nozzle adjacent said surface of said stock; and mechanism including a pair of cranks and a link connecting said cranks for supporting said blowpipe on said frame, the distance between the axes of said cranks being greater than the effective length of said link for sweeping said nozzle completely across said surface in a transverse plane including the vertical transverse axis of said stock, said mechanism being constructed and arranged to maintain the axis of said nozzle in constant intersection with said vertical transverse axis of the stock at a point located at a substantial distance above said surface while said nozzle is swung about said point, said point moving upwardly during the first half of the nozzle movement and moving downwardly during the last half of the movement, the distance of said point above said surface and the amount of vertical movement of said point being such that the end of said nozzle is constrained to move substantially parallel to said surface and said nozzle axis is oriented forwardly at the beginning of the cut and backwardly at the end of the cut.

LLOYD W. YOUNG.